United States Patent [19]

Lloyd

[11] 3,714,730

[45] Feb. 6, 1973

[54] FISHING LEAD

[76] Inventor: Kenneth R. Lloyd, 66 Chaparell Ranch Road, Cleveland, Tex. 77327

[22] Filed: Dec. 8, 1970

[21] Appl. No.: 96,026

[52] U.S. Cl. ................43/17.2, 43/42.72, 43/44.84, 43/44.97
[51] Int. Cl. ........................................A01k 97/00
[58] Field of Search......43/42.72, 42.02, 17.2, 44.97, 43/44.84

[56] References Cited

UNITED STATES PATENTS

| | | | |
|---|---|---|---|
| 1,250,053 | 12/1917 | Tukey | 43/42.72 |
| 155,266 | 9/1874 | Sprague | 43/42.72 X |
| 1,723,814 | 8/1929 | School | 43/42.72 X |

Primary Examiner—Antonio F. Guida
Assistant Examiner—Daniel J. Leach
Attorney—Ranseler O. Wyatt

[57] ABSTRACT

A fishing lead having a yieldably mounted connection to a fishing line, fish hooks having other leads thereon being yieldably connected laterally to the fishing lead, and a sinker connected by yieldable means to the lower end of the fishing lead. When tension is placed on one of the yieldable means, as when one of the members becomes stuck, and upon release of the tension, the member will be released by the force of the yieldable means returning to its original position.

3 Claims, 2 Drawing Figures

PATENTED FEB 6 1973

3,714,730

Kenneth R. Lloyd
INVENTOR.

BY Rensela J. Wyatt

ATTORNEY

FISHING LEAD

SUMMARY OF THE INVENTION

A fishing lead having coiled springs around the connecting parts which, when a member of the lead becomes stuck, may be placed under tension and released, causing a force applied to the stuck object to move the same away from the stuck position.

DESCRIPTION OF THE PREFERRED EMBODIMENT

Figures 1, 2:
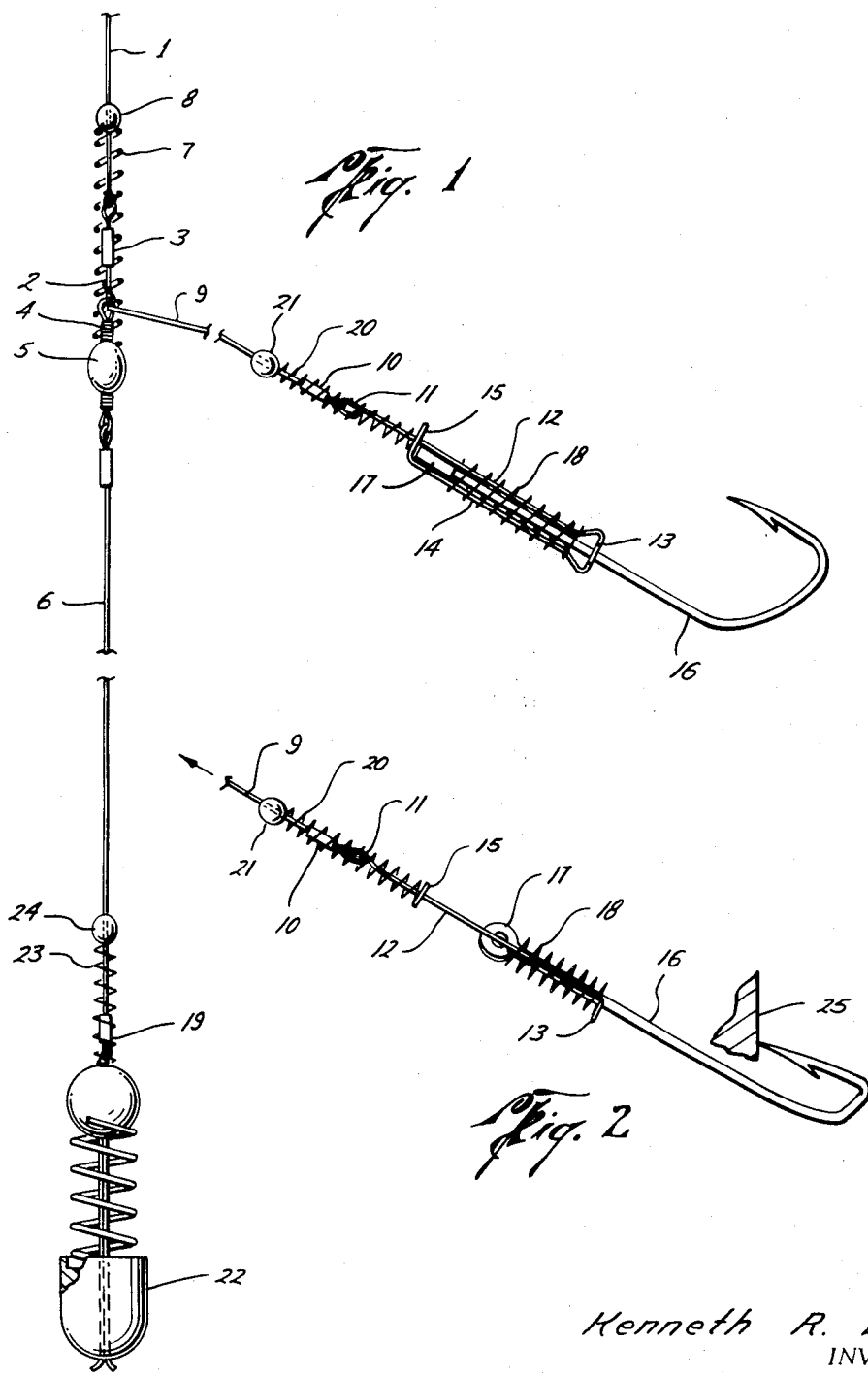
FIG. 1 is an elevational view of the device, showing the members of the lead in normal position.
FIG. 2 is an elevational view of the hook assembly, showing the hook stuck on an object, and the yieldable member placed under tension.

In the drawings the numeral 1 designates a fishing line to which the lead 2 is attached by means of the swivel 3. The opposite end of the lead 4 is connected to the upper eye of the swivel 4, the ball 5 dividing the upper and lower eyes of the swivel, and the sinker lead 6 is secured to the lower eye of said swivel 4. A coiled spring 7 having the ball 8 mounted on the upper end thereof, through which the fishing line 1 is extended, fits over the connection of the fishing line and lead 2, and the opposite end of the spring 7 abuts against the ball 5.

A hook lead 9 is secured to the upper eye of the swivel 4, at one end, and the other end is secured to one eye of the swivel 10. A yoke of suitable material, such as wire 11, has an eye formed at one end, which is secured to the other eye of the swivel 10, and said yoke has one longitudinal leg 12 extending downwardly and then bent outwardly, forming the laterally extended arc 13, and then bent to form another longitudinal leg 14 parallel with the leg 12, and is then bent inwardly forming a lateral loop 15 to form the anvil. A fish hook 16 has its upper portion fitted between the legs of said yoke, and the eye 17 of the fish hook bears against the anvil 15. A coil spring 18 is mounted over the yoke 11, with one end of said spring bearing against the laterally extended arc 13 and the other end bearing against the fish hook eye 17. Another coil spring 20 is mounted over the swivel 10 and a ball 21 is secured to one end of the spring 20, the ball 21 being provided with a passageway therethrough, through which the lead 9 extends, and the other end of said spring bears against the anvil 15.

The lead 6 has a sinker 22 on the opposite end thereof, of a construction substantially as described in my copending application for patent on a sinker release, filed Dec. 15, 1969, Ser. No. 885,039, the sinker 22 being secured to the lead by means of the swivel 19, over which is mounted the coil spring 23, which has the ball 24 secured to one end thereof, through which the lead 6 extends, and which bears against one end of the sinker 22.

In use, when the hook 16 becomes caught on a snag of any kind, such as a submerged rock or shell, as 25, the user pulls on the line 1, placing the spring 18 under compression, and then releases the line 1, permitting the spring to move the anvil 15 violently against the eye end of the hook 16, forcing the hook away from the object on which it is stuck. Where the lower end of the hook assembly becomes lodged in a crevice, or the like, the same action on the part of the user, that is, pulling on the line and then suddenly releasing same, will bring about the same reaction, forcing the stuck portion out of the crevice. Similarly, the swivel 3 and spring 7 may be manipulated, in the event the upper portion of the lead becomes stuck, and similarly the swivel 10 and spring 20 may be so manipulated, when the hook lead becomes stuck.

In the event one of the members 8, 21 24 becomes stuck, when the user pulls on the fishing line, the springs 7, 20 or 23 will arc outwardly, and the release of the line will cause the spring to flip outwardly away from the obstacle on which the end member has become stuck, in the instance of a hang-up other than in a crack or crevice; in either event, whether the type of obstacle causes the arcing of the spring, or a straight compression, the end result is the same, a forcing of the lead away from the obstacle upon release of the line. The balls 8, 21, 24 are preferably of plastic which may be joined to the spring end by heating the spring and then bringing the end of the spring into contact with the ball. This ball merely forms a terminus for the spring, and similar balls may be placed on either, or both ends of the springs 7, 20, 23, or the coil springs may be reduced in diameter at the respective ends, if desired, to accomplish the same purpose.

What I claim is:

1. A fishing lead having a swivel for receiving a fishing line at one end and a sinker lead swivel at the other end, a coil spring mounted over the first mentioned swivel, said spring abutting at one end against said sinker lead swivel and having a restriction at the other end through which the fishing line extends and a hook lead extending laterally between adjacent coils of said coil spring and secured to one end of said sinker lead swivel, a hook on the extended end of said hook lead and means on said hook lead for selectively asserting a pounding force on one end of said hook, said hook lead having a swivel on the extended end thereof and a yoke secured at one end to said last mentioned swivel and the other end of said yoke being outwardly flared forming a lateral stop, a second coil spring mounted over said last mentioned swivel and a portion of said yoke, a spring restriction mounted on said hook lead against which one end of said second spring bears and the other end of said second spring bearing against a laterally extended portion of said yoke, a fishhook shank mounted on said yoke bearing at one end against said laterally extended portion and a third coil spring mounted over said yoke and fishhook shank and having one end bearing against the outwardly flared end of said yoke.

2. The device defined in claim 1 wherein said sinker lead swivel has a lead thereon, a swivel on the extended end of said last mentioned lead, a sinker attached to the other end of said last mentioned swivel, a coil spring mounted on said last mentioned swivel, a restriction mounted on one end of said last mentioned spring through which said sinker lead extends, with the other end of said last mentioned spring abutting said sinker.

3. The device defined in claim 1 wherein said yoke is bent intermediate its length to form a pair of parallel legs, the bend of said yoke providing the lateral stop, a lateral loop on one of said legs being engaged about the other of said legs and forming the laterally extended portion, said hook having an enlarged portion forming an eye, the third coil spring having its other end bearing against said laterally extended loop.

* * * * *